(12) United States Patent
Cho et al.

(10) Patent No.: US 7,243,505 B2
(45) Date of Patent: Jul. 17, 2007

(54) COGENERATION SYSTEM

(75) Inventors: Eun Jun Cho, Kimpo-si (KR); Yun Ho Ryu, Seoul (KR); Young Seob Choi, Seoul (KR); Baik Young Cheong, Inchun-si (KR); Jae Won Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 93 days.

(21) Appl. No.: 11/046,815

(22) Filed: Feb. 1, 2005

(65) Prior Publication Data
US 2006/0037346 A1 Feb. 23, 2006

(30) Foreign Application Priority Data
Aug. 17, 2004 (KR) .................. 10-2004-0064808

(51) Int. Cl.
*F25B 27/02* (2006.01)
(52) U.S. Cl. .................... 62/238.7; 62/323.1; 62/324.6
(58) Field of Classification Search .... 62/238.6–238.7, 62/323.1–323.4, 324.1–324.6
See application file for complete search history.

(56) References Cited
U.S. PATENT DOCUMENTS

| | | | | |
|---|---|---|---|---|
| 4,910,969 A | * | 3/1990 | Dalin et al. ................. | 62/238.6 |
| 5,429,179 A | * | 7/1995 | Klausing ..................... | 165/240 |
| 6,460,360 B2 | * | 10/2002 | Hsieh ......................... | 62/238.1 |
| 6,543,531 B1 | * | 4/2003 | Casar et al. ................. | 165/202 |
| 6,769,481 B2 | * | 8/2004 | Yoshimura et al. ......... | 165/240 |
| 6,843,312 B2 | * | 1/2005 | Burk et al. .................. | 165/240 |
| 6,910,345 B2 | * | 6/2005 | Horstmann et al. ........ | 62/238.6 |

FOREIGN PATENT DOCUMENTS

| | | |
|---|---|---|
| JP | 08-219585 A | 8/1996 |
| JP | 2004286240 A * | 10/2004 |

* cited by examiner

*Primary Examiner*—William E. Tapolcai
(74) *Attorney, Agent, or Firm*—Birch, Stewart, Kolasch & Birch, LLP

(57) ABSTRACT

A cogeneration system including an engine, which drives a generator to generate electricity, a cooling/heating unit, which includes at least one compressor, a four-way valve, an outdoor heat exchanger, an expansion device, and an indoor heat exchanger, to establish a heat pump type refrigerant cycle, and a refrigerant over-heating unit to supply heat of cooling water used to cool the engine to a suction-side refrigerant line of the compressor of the cooling/heating unit, and to supply heat of exhaust gas discharged from the engine to the suction-side refrigerant line of the compressor and to a discharge-side refrigerant line of the compressor. In accordance with the cogeneration system, it is possible to maximize absorption of the waste heat of the engine while preventing compressor malfunction, and thus, to increase the refrigerant condensing temperature of the indoor heat exchanger. Thus, an enhancement in heating performance is achieved.

21 Claims, 4 Drawing Sheets

COGENERATION SYSTEM

BACKGROUND OF THE INVENTION

1. Field of the Invention

The present invention relates to a cogeneration system in which both the electricity and waste heat generated from an engine are used, and, more particularly, to a cogeneration system in which waste heat generated from an engine is supplied to suction and discharge sides of a compressor during a heating operation to achieve an enhancement in heating performance.

2. Description of the Related Art

In general, cogeneration systems are adapted to generate both electricity and heat from a single energy source.

Such a cogeneration system can recover heat of exhaust gas or waste heat of cooling water generated from an engine or turbine during an electricity generation operation, so that the cogeneration system can achieve an increase in energy efficiency of 70 to 80% over other systems. By virtue of such an advantage, the cogeneration system has recently been highlighted as an electricity and heat supply source for buildings. In particular, the cogeneration system exhibits highly-efficient energy utilization in that the recovered waste heat is mainly used to heat/cool a confined space and to heat water.

FIG. 1 is a schematic configuration diagram illustrating a conventional cogeneration system used in a heating/cooling apparatus.

As shown in FIG. 1, the conventional cogeneration system includes a gas engine 1, and a generator 3, which is driven by a driving force outputted from the gas engine 1, to generate electricity. The electricity generated from the generator 3 is used in a variety of devices including a cooling/heating unit 20, illumination devices, and other electrical products.

In the cogeneration system, waste heat generated from the gas engine 1, that is, heat of cooling water generated when the cooling water cools the gas engine 1, and heat of exhaust gas generated from the gas engine 1, is used during a heating operation of the cooling/heating unit 20.

Here, the cooling/heating unit 20 is of a heat pump type so that the cooling/heating unit 20 not only can be used as a cooling unit, but also can be used as a heating unit in a state in which the refrigerant flow direction in the refrigerant cycle is reversed. As in a general heat pump type configuration, the cooling/heating unit 20 includes a compressor 21, a four-way valve 23, an outdoor heat exchanger 25, an outdoor fan 26, an expansion device 27, and an indoor heat exchanger 29.

In particular, an air pre-heating heat exchanger 30 is arranged at the side of the outdoor heat exchanger 25 to preheat air passing around the outdoor heat exchanger 25 during a heating operation of the cooling/heating unit 20, using the waste heat of the gas engine 1.

In order to supply the waste heat to the cooling/heating unit 20, the cogeneration system also includes a cooling water heat exchanger 5 to recover the heat of the cooling water used to cool the gas engine 1, and an exhaust gas heat exchanger 9 arranged at an exhaust conduit 7 to recover the heat of the exhaust gas.

The cooling water heat exchanger 5 and exhaust gas heat exchanger 9 are connected to the air pre-heating heat exchanger 30 of the cooling/heating unit 20 by a heat transfer line 11, through which a heat transfer medium flows, so as to supply waste heat to the air pre-heating heat exchanger 30 during the heating operation of the cooling/heating unit 20. Thus, the cogeneration system recovers engine heat and exhaust gas heat, pre-heats outdoor air through the air pre-heating heat exchanger 30, using the recovered heat, and causes the pre-heated air to perform heat exchange with the outdoor heat exchanger 25, thereby preventing a degradation in the heating performance of the cooling/heating unit 20, which may occur when the temperature of the outdoor air is low.

When the cooling/heating unit 20 operates in a cooling mode, the flow path of the heat transfer medium is changed to communicate with a radiating line 13, which is connected to the heat transfer line 11, because it is unnecessary to supply waste heat. In this case, the waste heat is discharged to the atmosphere through a radiator 17, which includes a heat exchanger 15 and a radiator fan 16, or is supplied to and used in a water heater, a hot water supplier, or other systems.

In FIG. 1, reference character P designates pumps, each serving to force the heat transfer medium to flow through an associated portion of the heat transfer line 11, and reference character V designates valves, each serving to switch the flow path of the heat transfer medium between the heat transfer line 11 and the radiating line 13.

However, since the waste heat generated from the gas engine 1 is used only to pre-heat the outdoor heat exchanger 25 through the air pre-heating heat exchanger 30, the conventional cogeneration system has a limitation in enhancing the heating performance during the heating operation.

SUMMARY OF THE INVENTION

The present invention has been made in view of the above-mentioned problem, and it is an object of the invention to provide a cogeneration system in which waste heat generated from an engine is supplied to suction and discharge sides of a compressor, thereby achieving an enhancement in heating performance.

In accordance with one aspect, the present invention provides a cogeneration system comprising: an engine, which drives a generator to generate electricity; a cooling/heating unit, which comprises at least one compressor, a four-way valve, an outdoor heat exchanger, an expansion device, and an indoor heat exchanger, to establish a heat pump type refrigerant cycle; and a refrigerant over-heating unit to supply heat of cooling water used to cool the engine to a suction-side refrigerant line of the compressor of the cooling/heating unit, and to supply heat of exhaust gas discharged from the engine to the suction-side refrigerant line of the compressor and to a discharge-side refrigerant line of the compressor.

The refrigerant over-heating unit may comprise a suction-side refrigerant over-heater to supply the heat of the cooling water used to cool the engine and the heat of the exhaust gas discharged from the engine to the suction-side refrigerant line of the compressor, and a discharge-side refrigerant over-heater to supply the heat of the exhaust gas discharged from the engine to the discharge-side refrigerant line of the compressor.

The discharge-side refrigerant over-heater may comprise a first exhaust gas heat exchanger arranged at an exhaust conduit to perform heat exchange with the exhaust gas, which passes through the exhaust conduit. The suction-side refrigerant over-heater may comprise a second exhaust gas heat exchanger arranged at the exhaust conduit, downstream from the first exhaust gas heat exchanger with respect to a flowing direction of the exhaust gas passing through the exhaust conduit, to perform heat exchange with the exhaust gas.

The suction-side refrigerant over-heater may further comprise a first suction-side over-heating heat exchanger to perform heat exchange between the suction-side refrigerant line of the compressor and a cooling water line to transfer the cooling water heat of the engine, and a second suction-side over-heating heat exchanger to perform heat exchange between the suction-side refrigerant line of the compressor and a line to transfer heat recovered by the second exhaust gas heat exchanger.

The second suction-side over-heating heat exchanger may be arranged downstream from the first suction-side over-heating heat exchanger with respect to a flowing direction of a refrigerant in the refrigerant cycle.

The suction-side refrigerant over-heater may further comprise a cooling water heat exchanger arranged between the first suction-side over-heating heat exchanger and the engine to transfer the cooling water heat recovered from the engine to the first suction-side over-heating heat exchanger.

The refrigerant over-heating unit may further comprise a cooling water heat radiating unit arranged at the cooling water line, which extends from the engine to the cooling water heat exchanger, to radiate the heat of the cooling water when it is unnecessary to supply heat to a suction side of the compressor.

The refrigerant over-heating unit may further comprise a bypass line branched from the suction-side refrigerant line of the compressor, and a valve arranged in the suction-side refrigerant line to change a refrigerant path between the suction-side refrigerant line and the bypass line, whereby the refrigerant bypass line and the valve function to cause a refrigerant in the suction-side refrigerant line to flow without passing through the first suction-side over-heating heat exchanger and the second suction-side over-heating heat exchanger.

The discharge-side refrigerant over-heater may further comprise a discharge-side over-heating heat exchanger to perform heat exchange between a line to receive the heat recovered by the first exhaust gas heat exchanger and the discharge-side refrigerant line of the compressor.

The refrigerant over-heating unit may further comprise a bypass line branched from the discharge-side refrigerant line of the compressor, and a valve arranged in the discharge-side refrigerant line to change a refrigerant path between the discharge-side refrigerant line and the bypass line, whereby the refrigerant bypass line and the valve function to cause a refrigerant in the discharge-side refrigerant line to flow without passing through the discharge-side over-heating heat exchanger.

In accordance with another aspect, the present invention provides a cogeneration system comprising: an engine, which drives a generator to generate electricity; a cooling/heating unit, which comprises a compressor, a four-way valve, an outdoor heat exchanger, an expansion device, and an indoor heat exchanger, to establish a heat pump type refrigerant cycle; and a suction-side refrigerant over-heater to supply heat of cooling water used to cool the engine and heat of exhaust gas discharged from the engine to a suction-side refrigerant line of the compressor of the cooling/heating unit.

In accordance with another aspect, the present invention provides a cogeneration system comprising: an engine, which drives a generator to generate electricity; a cooling/heating unit, which comprises a compressor, a four-way valve, an outdoor heat exchanger, an expansion device, and an indoor heat exchanger, to establish a heat pump type refrigerant cycle; and a discharge-side refrigerant over-heater to supply heat of exhaust gas discharged from the engine to a discharge-side refrigerant line of the compressor.

In the cogeneration system of the present invention, the suction side of the compressor absorbs the engine cooling water heat and secondary exhaust gas heat, and the discharge side of the compressor absorbs the primary exhaust gas heat. Accordingly, it is possible to maximize absorption of the waste heat of the engine while preventing compressor malfunction, and thus, to increase the refrigerant condensing temperature of the indoor heat exchanger. Thus, an enhancement in heating performance is achieved.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of a cogeneration system according to the present invention will be described with reference to the annexed drawings.

Although a number of embodiments may be implemented for the cogeneration system according to the present invention, the following description will be given in conjunction with the most preferable embodiment. Since the basic configuration of the cogeneration system is the same as that of the conventional cogeneration system, no detailed description thereof will be given.

Figure 1:
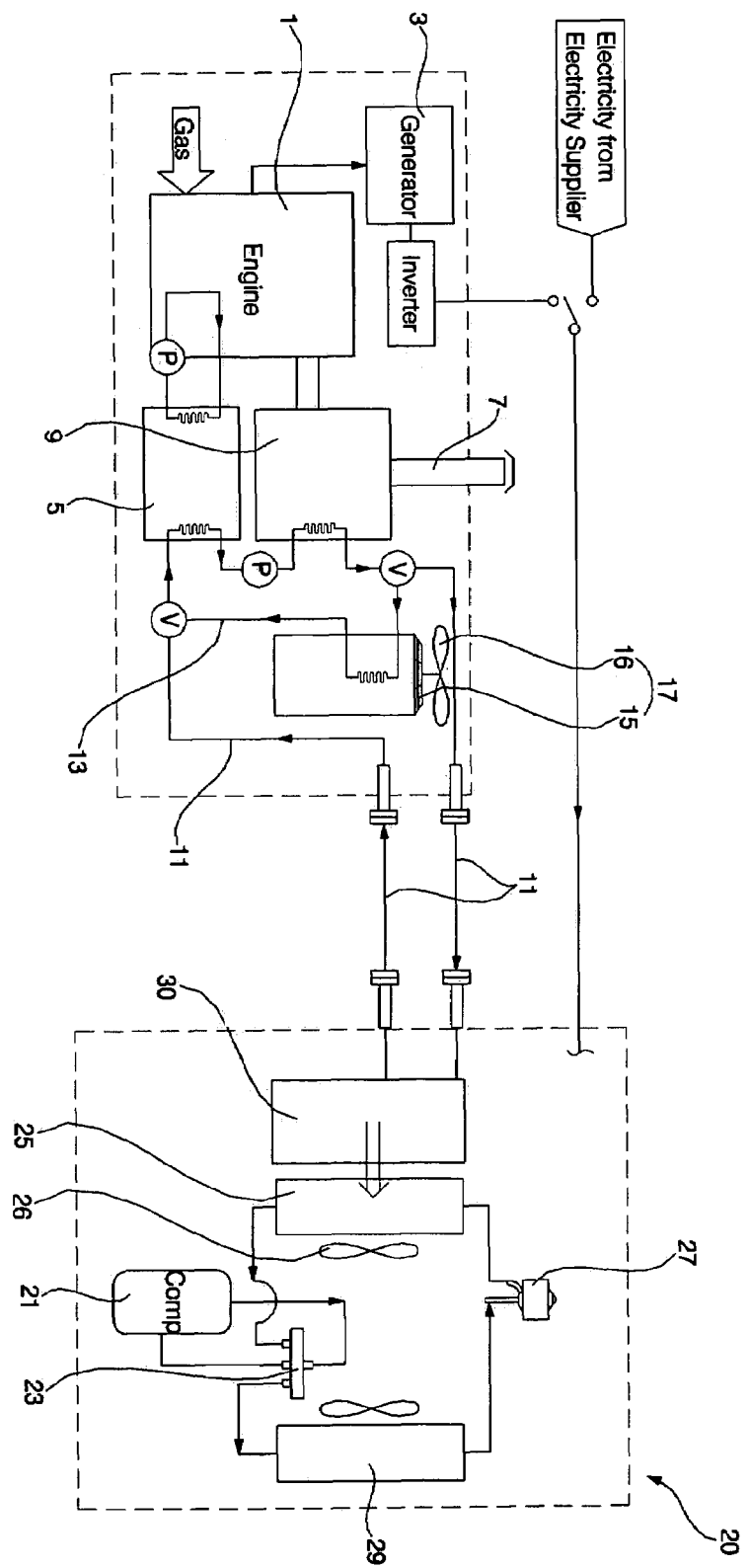
FIG. 1 is a schematic configuration diagram illustrating a conventional cogeneration system.
Figure 2:
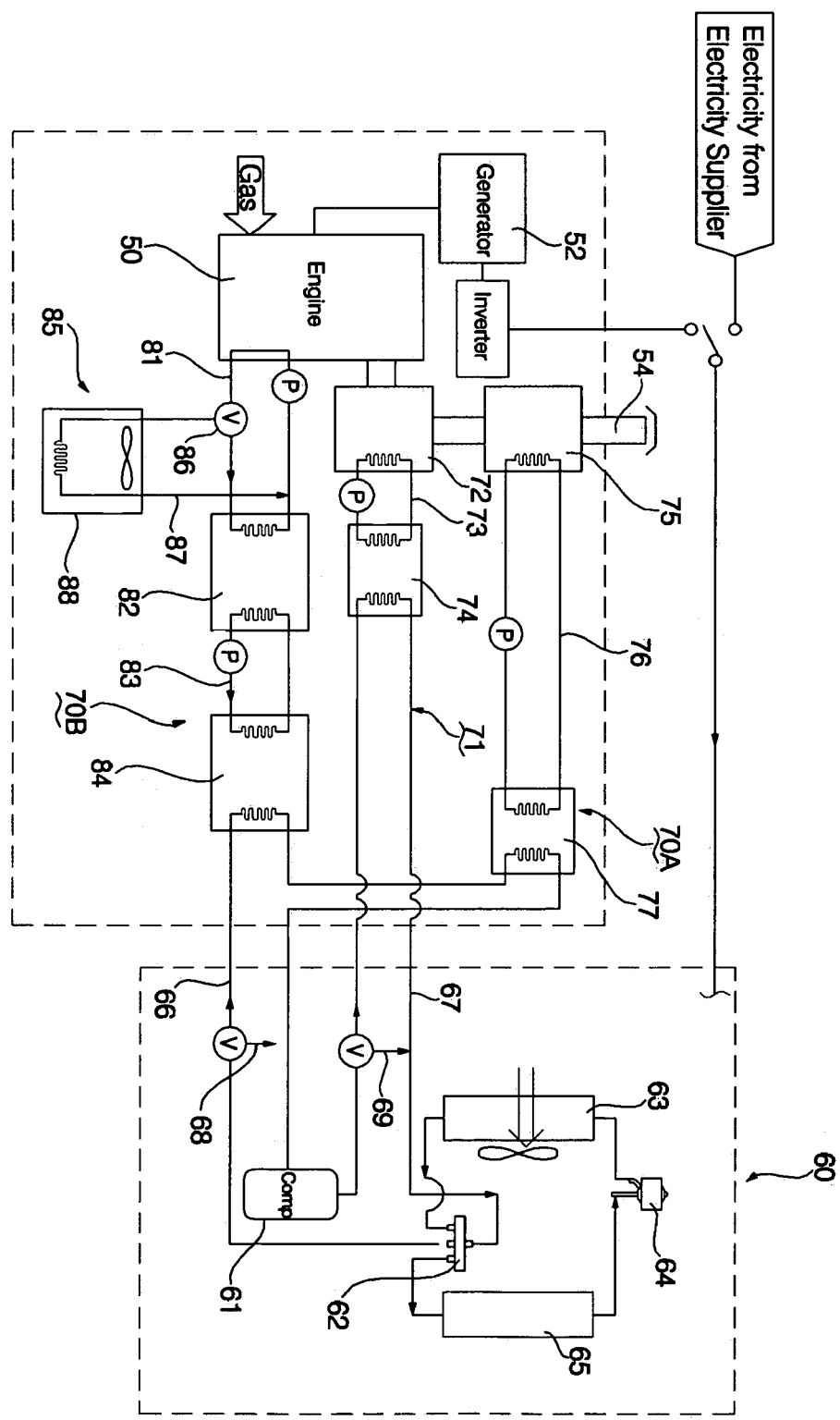
FIG. 2 is a schematic configuration diagram illustrating a cogeneration system according to an exemplary embodiment of the present invention.

FIG. 2 is a schematic configuration diagram illustrating a cogeneration system according to an exemplary embodiment of the present invention.

As shown in FIG. 2, the cogeneration system includes an engine 50, which operates, using fossil fuel such as natural gas or petroleum gas, a generator 52 to generate electricity, using a driving force of the engine 50, first and second exhaust gas heat exchangers 72 and 75 arranged at an exhaust conduit 54 to recover heat of exhaust gas of the engine 50, a cooling water heat exchanger 82 to recover heat of cooling water of the engine 50, and a radiator 88 to radiate the cooling water heat.

The cogeneration system also includes a cooling/heating unit 60, which uses a heat pump type refrigerant cycle using waste heat generated from the engine 50. The cooling/heating unit 60 includes at least one compressor 61, a four-way valve 62, an outdoor heat exchanger 63, an expansion device 64, and an indoor heat exchanger 65, as in a general heat pump type cooling/heating unit, which can be used as both a cooling unit and a heating unit in accordance with reversal of a refrigerant flow in a refrigerant cycle of the cooling/heating unit.

In particular, the cogeneration system further includes a refrigerant over-heating unit to supply the heat of the cooling water used to cool the engine 50 to a suction-side refrigerant line 66 of the compressor 61 of the cooling/heating unit 60, and to supply the heat of the exhaust gas discharged from the engine 50 to the suction-side refrigerant line 66 of the compressor 61 and to a discharge-side refrigerant line 67 of the compressor 61.

The refrigerant over-heating unit includes suction-side refrigerant over-heaters 70A and 70B to supply the heat of the cooling water used to cool the engine 50 and the heat of the exhaust gas discharged from the engine 50 to the suction-side refrigerant line 66 of the compressor 61, respectively, and a discharge-side refrigerant over-heater 71 to supply the heat of the exhaust gas discharged from the engine 50 to the discharge-side refrigerant line 67 of the compressor 61.

The discharge-side refrigerant over-heater 71 includes the first exhaust gas heat exchanger 72, which is arranged at the exhaust conduit 54 to perform heat exchange with the exhaust gas passing through the exhaust conduit 54. The suction-side refrigerant over-heater 70A includes the second exhaust gas heat exchanger 75, which is arranged at the exhaust conduit 54, downstream from the first exhaust gas heat exchanger 72 with respect to a flowing direction of the exhaust gas passing through the exhaust conduit 54, to perform heat exchange with the exhaust gas.

The suction-side refrigerant over-heater 70B includes a first suction-side over-heating heat exchanger 84 to perform heat exchange between the suction-side refrigerant line 66 of the compressor 61 and lines 81 and 83 to transfer the cooling water heat of the engine 50. The suction-side refrigerant over-heater 70A includes a second suction-side over-heating heat exchanger 77 to perform heat exchange between the suction-side refrigerant line 66 of the compressor 61 and a line 76 to transfer heat recovered by the second exhaust gas heat exchanger 75.

The second suction-side over-heating heat exchanger 77 is arranged downstream from the first suction-side over-heating heat exchanger 84 with respect to a flowing direction of the refrigerant. Thus, the suction-side refrigerant line 66 extends through the first suction-side over-heating heat exchanger 84 and second suction-side over-heating heat exchanger 77, in this order.

The cooling water heat exchanger 82 is arranged between the first suction-side over-heating heat exchanger 84 and the engine 50 to transfer the cooling water heat recovered from the engine 50 to the first suction-side over-heating heat exchanger 84.

A cooling water heat radiating unit 85 is arranged at the cooling water line 81, which extends from the engine 50 to the cooling water heat exchanger 82, to radiate the heat of the cooling water when it is unnecessary to supply heat to the suction-side refrigerant line 66 of the compressor 61.

In order to radiate the heat of the cooling water to the atmosphere, the cooling water heat radiating unit 85 includes a radiating line 87 branched from the cooling water line 81, a valve 86 to bypass the cooling water in the cooling water line 81 through the radiating line 87, and a radiator 88 arranged at the radiating line 87. The radiator 88 may be connected to other systems to use the waste heat of the cooling water, as in the above-described case in which the heat of the exhaust gas is used to heat water or to supply hot water.

A refrigerant bypass line 68 is branched from the suction-side refrigerant line 66 of the compressor 61. A valve V is also arranged in the suction-side refrigerant line 66 to change a refrigerant path between the suction-side refrigerant line 66 and the refrigerant bypass line 68. The refrigerant bypass line 68 and valve V serve to cause the refrigerant in the suction-side refrigerant line 66 to directly flow toward the compressor 61 without passing through the first and second suction-side over-heating heat exchangers 84 and 77.

In addition to the first exhaust gas heat exchanger 72, the discharge-side refrigerant over-heater 71 includes a discharge-side over-heating heat exchanger 74 to perform heat exchange between a line 73 to receive the heat recovered by the first exhaust gas heat exchanger 72 and the discharge-side refrigerant line 67 of the compressor 61.

A refrigerant bypass line 69 is branched from the discharge-side refrigerant line 67 of the compressor 61. A valve V is also arranged in the discharge-side refrigerant line 67 to change a refrigerant path between the discharge-side refrigerant line 67 and the refrigerant bypass line 69. The refrigerant bypass line 69 and valve V associated therewith serve to cause the refrigerant in the discharge-side refrigerant line 67 to directly flow toward the four-way valve 62 without passing through the discharge-side over-heating heat exchanger 74.

Since the cogeneration system of this embodiment includes several heat exchangers including the first exhaust gas heat exchanger 72, second exhaust gas heat exchanger 75, cooling water heat exchanger 82, first suction-side over-heating heat exchanger 84, second suction-side over-heating heat exchanger 77, and discharge-side over-heating exchanger 74, it is possible to operate a water heater or other heat consumers even during a heating operation, by appropriately implementing a water-heating heat exchanger or a water-heating vessel having a heat exchanging function, which receive heat from the above heat exchangers, in accordance with the given design condition.

In FIG. 2, reference character P designates pumps, each serving to force the heat transfer medium to flow through an associated line.

Figure 3:
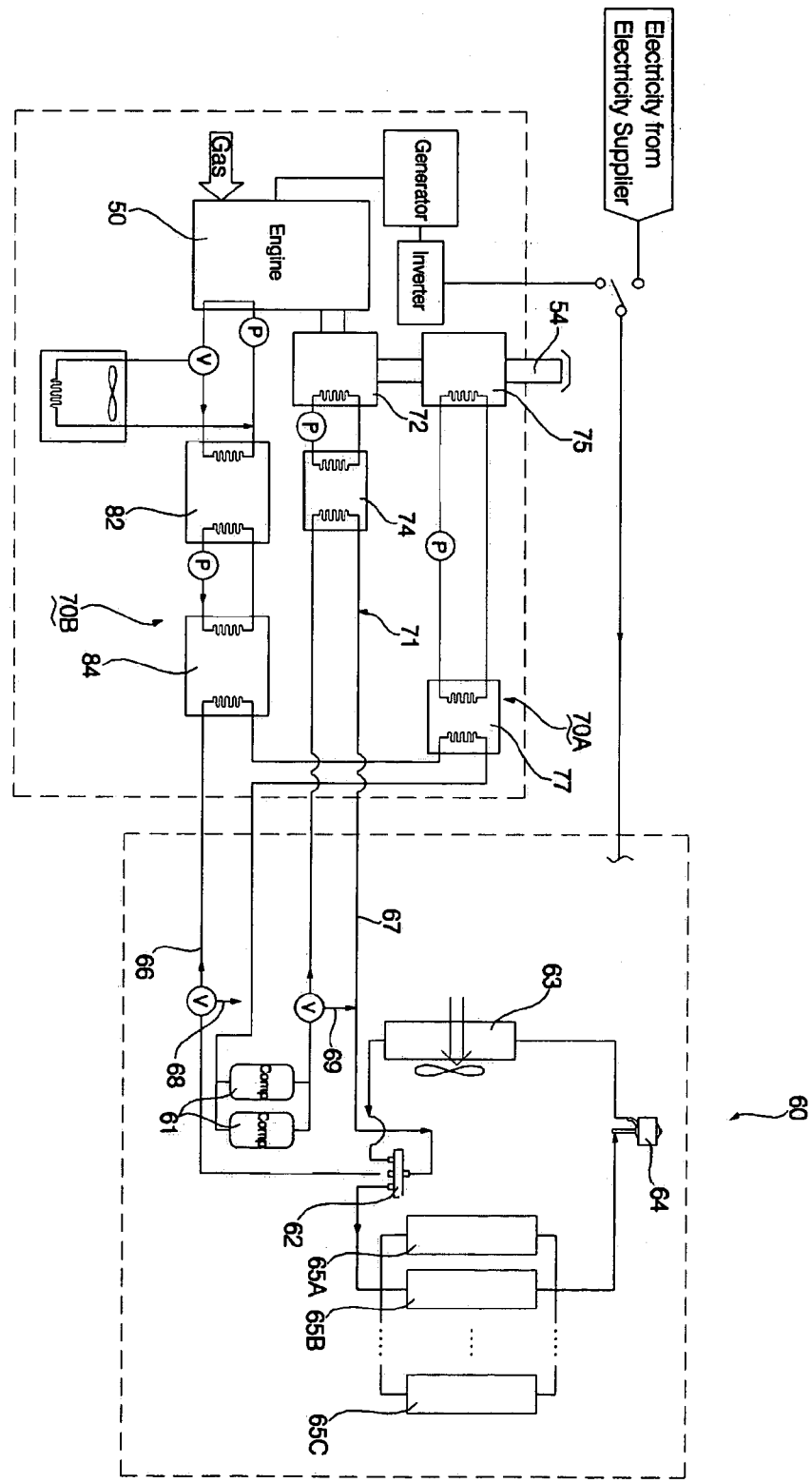
FIG. 3 is a schematic configuration diagram illustrating a cogeneration system according to another exemplary embodiment of the present invention in which a plurality of indoor heat exchangers are used.

On the other hand, FIG. 3 is a schematic configuration diagram illustrating a cogeneration system according to another exemplary embodiment of the present invention in which a plurality of indoor heat exchangers are used. In this case, a plurality of indoor heat exchangers 65A, 65B, and 65C are arranged in serial or parallel in a single cooling/heating unit 60 to cool/heat a plurality of confined spaces, respectively.

Constituent elements of the configuration of FIG. 3 corresponding to those of FIG. 2 are designated by the same reference numerals, respectively, and no description thereof will be given. Similarly, constituent elements of the configuration of FIG. 4, which will be described hereinafter, corresponding to those of FIG. 2 are designated by the same reference numerals, respectively, and no description thereof will be given.

Figure 4:
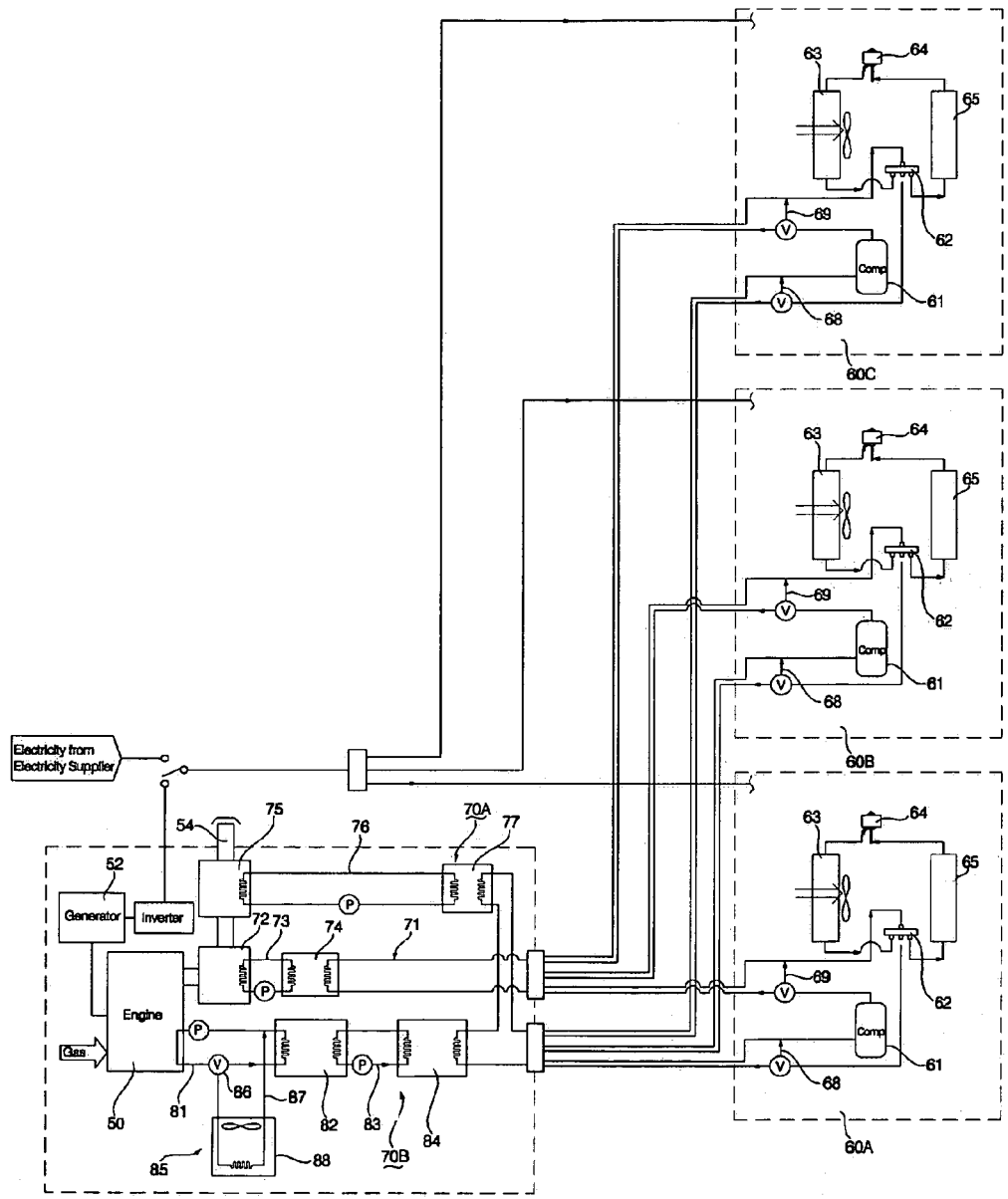
FIG. 4 is a schematic configuration diagram illustrating a cogeneration system according to another exemplary embodiment of the present invention in which a plurality of cooling/heating units are used.

FIG. 4 is a schematic configuration diagram illustrating a cogeneration system according to another exemplary embodiment of the present invention in which a plurality of cooling/heating units are used. In this case, distributors 90 and 95 are arranged at a suction-side refrigerant line 66 and a discharge-side refrigerant line 67, respectively, to distribute heat to a plurality of cooling/heating units 60A, 60B, and 60C.

Meanwhile, the above-described heat exchangers may have various heat transfer configurations, for example, a heat transfer configuration in which heat transfer is carried out through a thermal conductor, or a heat transfer configuration in which heat transfer is carried out through a fluid present in a heat exchanger, in accordance with the given design condition or the given requirement.

Hereinafter, operation of the cogeneration system according to the present invention will be described.

Electricity, which is generated by a driving force from the engine 50, may be used to operate the compressor 61 of the cooling/heating unit 50 and diverse controllers.

During a heating operation of the cooling/heating unit 60, a refrigerant flows through the compressor 61, four-way valve 62, indoor heat exchanger 65, expansion device 64, and outdoor heat exchanger 63, in this order, to perform a heating operation. In this case, the refrigerant sucked toward the compressor 61 through the suction-side refrigerant line 66 is primarily pre-heated by the heat of the cooling water of the engine 50 while passing through the first suction-side over-heating heat exchanger 84, and is secondarily pre-heated by the heat of the exhaust gas of the engine 50 while passing through the second suction-side over-heating heat exchanger 77. The refrigerant is then introduced into the compressor 61.

At this time, the cooling water heat and exhaust gas heat are transferred to the first and second suction-side heat exchangers 84 and 77 through the cooling water heat exchanger 82 and second exhaust gas heat exchanger 75, respectively.

Also, the refrigerant discharged from the compressor 61 through the discharge-side refrigerant line 67 is heated while passing through the discharge-side over-heating heat exchanger 74, and is then fed to the indoor heat exchanger 65.

Since the refrigerant is pre-heated by the waste heat of the engine 50 at both the suction and discharge sides of the compressor 61, as described above, the refrigerant passes through the indoor heat exchanger 65 serving as a condenser, under the condition in which the temperature of the refrigerant is increased to a desired level. Accordingly, it is possible to provide heat of a higher temperature to a confined space, and thus, to achieve an enhancement in heating performance.

In particular, the suction side of the compressor 61 uses cooling water heat and secondary exhaust gas heat, which are maintained at a temperature relatively lower than that of the primary exhaust gas heat used at the discharge side of the compressor 61. Accordingly, it is possible to prevent the refrigerant from being excessively pre-heated, and thus, from being excessively increased in temperature while passing through the compressor 61. At the discharge side of the compressor 61, however, the refrigerant absorbs heat of a high temperature while passing through the discharge-side over-heating heat exchanger 74, which is maintained at a relatively high temperature, and then passes through the indoor heat exchanger 65. Thus, it is possible to prevent the compressor 61 form being damaged due to an excessively high increase in pressure.

Also, since the suction-side refrigerant line 66 is indirectly connected to the cooling water heat exchanger 82 such that the suction-side refrigerant line 66 performs heat exchange with the cooling water heat exchanger 82 via the first suction-side over-heating heat exchanger 84, it is possible to prevent the refrigerant from being over-heated, and thus, rapidly degraded.

When the cooling/heating unit 60 operates in a cooling mode or stops the cooling/heating operation thereof, it is necessary to prevent heat of exhaust gas and heat of cooling water generated from the engine 50 from being supplied to the cooling/heating unit 60. In this case, accordingly, the valve V of the suction-side refrigerant line 66, the valve V of the discharge-side refrigerant line 67, and the valve 86 of the cooling water line 81 are selectively operated to change fluid paths associated with the exhaust gas heat and cooling water heat, respectively.

As a result, the refrigerant in the cooling/heating unit 60 flows through the bypass lines 68 and 69, so that the refrigerant is circulated through the refrigerant cycle under the condition in which the temperature of the refrigerant is maintained at a normal level. Thus, the cooling operation is normally carried out.

As apparent from the above description, in the cogeneration system of the present invention, the suction side of the compressor absorbs the engine cooling water heat and secondary exhaust gas heat, and the discharge side of the compressor absorbs the primary exhaust gas heat. Accordingly, it is possible to maximize absorption of the waste heat of the engine while preventing compressor malfunction, and thus, to increase the refrigerant condensing temperature of the indoor heat exchanger. Thus, an enhancement in heating performance is achieved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A cogeneration system comprising:
   an engine, which drives a generator to generate electricity;
   a cooling/heating unit, which comprises at least one compressor, a four-way valve, an outdoor heat exchanger, an expansion device, and an indoor heat exchanger, to establish a heat pump type refrigerant cycle; and
   a refrigerant over-heating unit to supply heat of cooling water used to cool the engine to a suction-side refrigerant line of the compressor of the cooling/heating unit, and to supply heat of exhaust gas discharged from the engine to the suction-side refrigerant line of the compressor and to a discharge-side refrigerant line of the compressor.

2. The cogeneration system according to claim 1, wherein the refrigerant over-heating unit comprises:
   a suction-side refrigerant over-heater to supply the heat of the cooling water used to cool the engine and the heat of the exhaust gas discharged from the engine to the suction-side refrigerant line of the compressor; and
   a discharge-side refrigerant over-heater to supply the heat of the exhaust gas discharged from the engine to the discharge-side refrigerant line of the compressor.

3. The cogeneration system according to claim 2, wherein:
   the discharge-side refrigerant over-heater comprises a first exhaust gas heat exchanger arranged at an exhaust conduit to perform heat exchange with the exhaust gas, which passes through the exhaust conduit; and
   the suction-side refrigerant over-heater comprises a second exhaust gas heat exchanger arranged at the exhaust conduit, downstream from the first exhaust gas heat exchanger with respect to a flowing direction of the exhaust gas passing through the exhaust conduit, to perform heat exchange with the exhaust gas.

4. The cogeneration system according to claim 3, wherein the suction-side refrigerant over-heater further comprises:
   a first suction-side over-heating heat exchanger to perform heat exchange between the suction-side refrigerant line of the compressor and a cooling water line to transfer the cooling water heat of the engine; and a second suction-side over-heating heat exchanger to perform heat exchange between the suction-side refrigerant line of the compressor and a line to transfer heat recovered by the second exhaust gas heat exchanger.

5. The cogeneration system according to claim 4, wherein the second suction-side over-heating heat exchanger is arranged downstream from the first suction-side over-heating heat exchanger with respect to a flowing direction of a refrigerant in the refrigerant cycle.

6. The cogeneration system according to claim 4, wherein the suction-side refrigerant over-heater further comprises:
a cooling water heat exchanger arranged between the first suction-side over-heating heat exchanger and the engine to transfer the cooling water heat recovered from the engine to the first suction-side over-heating heat exchanger.

7. The cogeneration system according to claim 4, wherein the refrigerant over-heating unit further comprises:
a cooling water heat radiating unit arranged at the cooling water line, which extends from the engine to the cooling water heat exchanger, to radiate the heat of the cooling water when it is unnecessary to supply heat to a suction side of the compressor.

8. The cogeneration system according to claim 4, wherein the refrigerant over-heating unit further comprises:
a bypass line branched from the suction-side refrigerant line of the compressor; and
a valve arranged in the suction-side refrigerant line to change a refrigerant path between the suction-side refrigerant line and the bypass line,
whereby the refrigerant bypass line and the valve function to cause a refrigerant in the suction-side refrigerant line to flow without passing through the first suction-side over-heating heat exchanger and the second suction-side over-heating heat exchanger.

9. The cogeneration system according to claim 3, wherein the discharge-side refrigerant over-heater further comprises:
a discharge-side over-heating heat exchanger to perform heat exchange between a line to receive the heat recovered by the first exhaust gas heat exchanger and the discharge-side refrigerant line of the compressor.

10. The cogeneration system according to claim 9, wherein the refrigerant over-heating unit further comprises:
a bypass line branched from the discharge-side refrigerant line of the compressor; and
a valve arranged in the discharge-side refrigerant line to change a refrigerant path between the discharge-side refrigerant line and the bypass line,
whereby the refrigerant bypass line and the valve function to cause a refrigerant in the discharge-side refrigerant line to flow without passing through the discharge-side over-heating heat exchanger.

11. A cogeneration system comprising:
an engine, which drives a generator to generate electricity;
a cooling/heating unit, which comprises a compressor, a four-way valve, an outdoor heat exchanger, an expansion device, and an indoor heat exchanger, to establish a heat pump type refrigerant cycle;
a suction-side refrigerant over-heater to supply heat of cooling water used to cool the engine and heat of exhaust gas discharged from the engine to a suction-side refrigerant line of the compressor of the cooling/heating unit; and a discharge-side refrigerant over-heater to supply the heat of the exhaust gas discharged from the engine to a discharge-side refrigerant line of the compressor.

12. A cogeneration system comprising:
an engine, which drives a generator to generate electricity;
a cooling/heating unit, which comprises a compressor a four-way valve, an outdoor heat exchanger, an expansion device, and an indoor heat exchanger, to establish a heat pump type refrigerant cycle; and
a suction-side refrigerant over-heater to supply heat of cooling water used to cool the engine and heat of exhaust gas discharged from the engine to a suction-side refrigerant line of the compressor of the cooling/heating unit,
wherein the suction-side refrigerant over-heater further comprises:
an exhaust gas heat exchanger arranged at an exhaust conduit to perform heat exchange with the exhaust gas, which passes through the exhaust conduit;
a first suction-side over-heating heat exchanger to perform heat exchange between the suction-side refrigerant line of the compressor and a cooling water line to transfer the cooling water heat of the engine; and
a second suction-side over-heating heat exchanger to perform heat exchange between the suction-side refrigerant line of the compressor and a line to transfer heat recovered by the exhaust gas heat exchanger.

13. The cogeneration system according to claim 12, wherein the second suction-side over-heating heat exchanger is arranged downstream from the first suction-side over-heating heat exchanger with respect to a flowing direction of a refrigerant in the refrigerant cycle.

14. The cogeneration system according to claim 12, wherein the suction-side refrigerant over-heater further comprises:
a cooling water heat exchanger arranged between the first suction-side over-heating heat exchanger and the engine to transfer the cooling water heat recovered from the engine to the first suction-side over-heating heat exchanger.

15. The cogeneration system according to claim 14, further comprising:
a cooling water heat radiating unit arranged at the cooling water line, which extends from the engine to the cooling water heat exchanger, to radiate the heat of the cooling water when it is unnecessary to supply heat to a suction side of the compressor.

16. The cogeneration system according to claim 12, further comprising:
a bypass line branched from the suction-side refrigerant line of the compressor; and
a valve arranged in the suction-side refrigerant line to change a refrigerant path between the suction-side refrigerant line and the bypass line,
whereby the refrigerant bypass line and the valve function to cause a refrigerant in the suction-side refrigerant line to flow without passing through the first suction-side over-heating heat exchanger and the second suction-side over-heating heat exchanger.

17. A cogeneration system comprising:
an engine, which drives a generator to generate electricity;
a cooling/heating unit, which comprises a compressor, a four-way valve, an outdoor heat exchanger, an expansion device, and an indoor heat exchanger, to establish a heat pump type refrigerant cycle; and a discharge-side refrigerant over-heater during a heating mode of the cooling/heating unit to supply heat of exhaust gas discharged from the engine to a discharge-side refrigerant line of the compressor before a refrigerant in the discharge-side refrigerant line enters the indoor heat exchanger.

18. The cogeneration system according to claim 17, wherein the discharge-side refrigerant over-heater comprises:

an exhaust gas heat exchanger arranged at an exhaust conduit to perform heat exchange with the exhaust gas, which passes through the exhaust conduit; and a discharge-side over-heating heat exchanger to perform heat exchange between a line to receive heat recovered by the exhaust gas heat exchanger and the discharge-side refrigerant line of the compressor.

19. A cogeneration system comprising:

an engine, which drives a generator to generate electricity:

a cooling/heating unit, which comprises a compressor, a four-way valve, an outdoor heat exchanger an expansion device, and an indoor heat exchanger, to establish a heat pump type refrigerant cycle; and a discharge-side refrigerant over-heater to supply heat of exhaust gas discharged from the engine to a discharge-side refrigerant line of the compressor, wherein the discharge-side refrigerant over-heater comprises:

an exhaust gas heat exchanger arranged at an exhaust conduit to perform heat exchange with the exhaust gas, which passes through the exhaust conduit; and a discharge-side over-heating heat exchanger to perform heat exchange between a line to receive heat recovered by the exhaust gas heat exchanger and the discharge-side refrigerant line of the compressor, wherein the cogeneration system further comprises:

a bypass line branched from the discharge-side refrigerant line of the compressor; and a valve arranged in the discharge-side refrigerant line to change a refrigerant path between the discharge-side refrigerant line and the bypass line, whereby the refrigerant bypass line and the valve function to cause a refrigerant in the discharge-side refrigerant line to flow without passing through the discharge-side over-heating heat exchanger.

20. The cogeneration system according to claim 19, further comprising:

a suction-side refrigerant over-heater to supply heat of cooling water used to cool the engine and the heat of the exhaust gas discharged from the engine to a suction-side refrigerant line of the compressor of the cooling/heating unit.

21. The cogeneration system according to claim 11, wherein the discharge-side refrigerant over-heater during a heating mode of the cooling/heating unit supplies the heat of the exhaust gas to the discharge-side refrigerant line of the compressor before a refrigerant in the discharge-side refrigerant line enters the indoor heat exchanger.

* * * * *